United States Patent
Kang et al.

(10) Patent No.: US 9,749,116 B2
(45) Date of Patent: Aug. 29, 2017

(54) METHOD AND APPARATUS FOR PERFORMING UPLINK HARQ IN WIRELESS COMMUNICATION SYSTEM

(75) Inventors: Ji Won Kang, Anyang-si (KR); Jin Young Chun, Anyang-si (KR); Ki Tae Kim, Anyang-si (KR); Su Nam Kim, Anyang-si (KR); Bin Chul Ihm, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 240 days.

(21) Appl. No.: 14/002,632

(22) PCT Filed: Feb. 29, 2012

(86) PCT No.: PCT/KR2012/001539
§ 371 (c)(1),
(2), (4) Date: Oct. 2, 2013

(87) PCT Pub. No.: WO2012/118334
PCT Pub. Date: Sep. 7, 2012

(65) Prior Publication Data
US 2014/0016589 A1     Jan. 16, 2014

Related U.S. Application Data

(60) Provisional application No. 61/448,146, filed on Mar. 1, 2011, provisional application No. 61/475,201, filed on Apr. 13, 2011, provisional application No. 61/563,613, filed on Nov. 25, 2011.

(51) Int. Cl.
*H04L 5/00* (2006.01)
*H04L 1/18* (2006.01)

(52) U.S. Cl.
CPC .......... *H04L 5/0092* (2013.01); *H04L 1/1854* (2013.01); *H04L 1/1861* (2013.01);
(Continued)

(58) Field of Classification Search
CPC ... H04L 5/0053; H04L 5/0048; H04L 5/0023; H04L 5/0055; H04L 5/0094;
(Continued)

(56) References Cited

U.S. PATENT DOCUMENTS

2010/0165847 A1   7/2010  Kamuf et al.
2010/0208679 A1*  8/2010  Papasakellariou .... H04L 1/1614
                                                                370/329
(Continued)

FOREIGN PATENT DOCUMENTS

KR   10-2011-0010681 A   2/2011
WO   WO 2009/116759 A2   9/2009
(Continued)

*Primary Examiner* — Jae Y Lee
*Assistant Examiner* — Aixa Guadalupe-Cruz
(74) *Attorney, Agent, or Firm* — Birch, Stewart, Kolasch & Birch, LLP

(57) ABSTRACT

Provided are a method and an apparatus for a terminal performing uplink HARQ in a multi-node system comprising a plurality of nodes and a base station, which is connected to and can control each of the plurality of nodes. The method comprises the following steps: receiving information on control channel allocation from the base station; transmitting uplink data to at least one node from the plurality of nodes; and receiving from the at least one node an acknowledgement/not-acknowledgement (ACK/NACK) signal with respect to the uplink data, based on the information on the control channel allocation.

8 Claims, 16 Drawing Sheets

(52) U.S. Cl.
CPC .......... *H04L 5/0055* (2013.01); *H04L 1/1812* (2013.01); *H04L 1/1864* (2013.01); *H04L 1/1896* (2013.01); *H04L 5/0048* (2013.01)

(58) Field of Classification Search
CPC ... H04L 1/1893; H04L 5/0092; H04L 1/0073; H04L 1/1896; H04L 1/1864; H04L 5/0091; H04L 5/003; H04L 5/0058; H04L 1/18; H04W 72/0406; H04W 72/0453; H04W 72/12; H04W 72/0446; H04W 72/048; H04W 72/121; H04B 7/0452
See application file for complete search history.

(56) References Cited

U.S. PATENT DOCUMENTS

| | | | |
|---|---|---|---|
| 2010/0302983 | A1 | 12/2010 | McBeath et al. |
| 2011/0075624 | A1* | 3/2011 | Papasakellariou et al. .. 370/329 |
| 2011/0211595 | A1* | 9/2011 | Geirhofer ............ H04B 7/2606 370/478 |
| 2011/0243090 | A1* | 10/2011 | Grovlen .................... H04L 1/18 370/329 |
| 2012/0032926 | A1* | 2/2012 | Douxchamps ...... G02F 1/13338 345/175 |
| 2012/0078933 | A1 | 3/2012 | Kim et al. |
| 2012/0120908 | A1 | 5/2012 | Ahn et al. |
| 2012/0207099 | A1* | 8/2012 | Lindh .................. H04L 5/0057 370/329 |

FOREIGN PATENT DOCUMENTS

| | | | | |
|---|---|---|---|---|
| WO | WO 2010049754 A1 | * | 5/2010 | .......... H04L 5/0007 |
| WO | 2010/131926 A2 | | 11/2010 | |

* cited by examiner

METHOD AND APPARATUS FOR PERFORMING UPLINK HARQ IN WIRELESS COMMUNICATION SYSTEM

CROSS-REFERENCE TO RELATED APPLICATIONS

This non-provisional application is a National Stage entry under U.S.C. §371 of International Application No. PCT/KR2012/001539 filed on Feb. 29, 2012, which claims the benefit of priority of U.S. Provisional Applications 61/448,146 filed on Mar. 1, 2011, 61/475,201 filed on Apr. 13, 2011 and 61/563,613 filed on Nov. 25, 2011, all of which are incorporated by reference in their entirety herein.

BACKGROUND OF THE INVENTION

Field of the Invention

The present invention relates to wireless communication and, more particularly, to a method of performing an uplink Hybrid Automatic Repeat reQuest (HARQ) in a wireless communication system and an apparatus using the method.

Related Art

Recently, the data transfer rate over a wireless communication network is rapidly increasing. This results from the appearance and spread of a variety of devices, such as smart phones and tablet PCs which require Machine-to-Machine (M2M) communication and a high data transfer rate. In order to meet a required higher data transfer rate, Carrier Aggregation (CA) technology in which more frequency bands are efficiently used, Cognitive Radio (CR) technology, etc. are emerging. In order to increase a data capacity a limited frequency, multiple antenna technology, multiple base station cooperation technology, etc. are recently highlighted.

Furthermore, a wireless communication network is evolving into an increase in the density of accessible nodes around a user. Here, the nodes mean antennas or a group of antennas which are spaced apart from one another at specific intervals in a Distributed Antenna System (DAS). However, the nodes are not limited to this sense, but can be used as a broader sense. That is, the node can be a macro eNodeB, a pico-cell eNodeB (PeNB), a home eNodeB (HeNB), a Remote Radio Head (RRH), a Remote Radio Unit (RRU), a Relay Node (RN), or distributed antennas (or group).

A wireless communication system equipped with nodes distributed at high density can have better system performance through cooperation between the nodes. That is, if the transmission and reception of nodes are managed by one control station and thus the nodes operate like antennas or a group of antennas for one cell, the nodes can have more excellent system performance than that when the nodes operate as independent base stations without cooperation. A wireless communication system including a plurality of nodes and a base station controlling the plurality of nodes is hereinafter called a multi-node system.

Meanwhile, in a wireless communication system, a Hybrid Automatic Repeat reQuest (HARQ) is performed between a transmitter and a receiver. The HARQ is a signal transmission and reception method of checking whether or not data received from a physical layer includes an error that cannot be decoded and requesting retransmission if an error is generated. If an error is generated in a process of performing an HARQ, a receiver sends not-acknowledgement (NACK) through a control channel. If an error is not generated in the process of performing an HARQ, the receiver sends acknowledgement (ACK).

A multi-node system can also support this HARQ. In a multi-node system, however, an HARQ may not be smoothly performed using only existing control channels for ACK/NACK transmission because the multi-node system can provide service to more terminals than those of an existing wireless communication system. Furthermore, even in an existing wireless communication system, an HARQ may not be smoothly performed according to an increase in the number of supported terminals.

SUMMARY OF THE INVENTION

There are provided a method and apparatus for performing an uplink HARQ in a wireless communication system.

In an aspect, there is provided a method of user equipment performing an uplink Hybrid Automatic Repeat reQuest (HARQ) in a multi-node system including a plurality of nodes and a base station connected to the plurality of nodes and capable of controlling the plurality of nodes. The method including the steps of receiving information about the allocation of a control channel from the base station; sending uplink data to at least one of the plurality of nodes; and receiving an acknowledgement/not-acknowledgement (ACK/NACK) signal for the uplink data from the at least one node based on the information about the allocation of the control channel, Wherein a subframe in which the ACK/NACK signal is received includes a plurality of Orthogonal Frequency Division Multiplexing (OFDM) symbols in a time domain and includes a plurality of resource blocks in a frequency domain, a physical hybrid-ARQ indicator channel (PHICH) is allocated to first N OFDM symbols within the subframe and an Enhanced-PHICH (E-PHICH) is allocated to at least one OFDM symbol subsequently to the first N OFDM symbols, the information about the allocation of the control channel includes information about the allocation of the E-PHICH, and the ACK/NACK signal is received through the E-PHICH. The N is a natural number of any one of 1 to 4.

The PHICH may be placed in the first OFDM symbol of the subframe.

The information about the allocation of the control channel may be received through a higher layer signal.

The information about the allocation of the control channel may be received through a Radio Resource Control (RRC) message.

The method may further include a step of receiving information indicative of an ACK/NACK transmission region from the base station. The information indicative of the ACK/NACK transmission region may be information indicating that the ACK/NACK signal is transmitted through which one of the PHICH and the E-PHICH.

The method may further include a step of receiving the ACK/NACK signal through the PHICH if the information indicative of the ACK/NACK transmission region indicates the PHICH.

The E-PHICH may be included in an Enhanced (E)-control region through which the base station can send a control signal to a relay station, and the E-control region may include OFDM symbols from a specific OFDM symbol of a first slot to the last OFDM symbol or the second-last OFDM symbol of a second slot indicated by a higher layer signal in relation to one subframe.

The E-PHICH may be received in a specific Control Channel Element (CCE) within the E-control region.

Radio resources through which the E-PHICH is received may be determined based on the number of PHICH groups capable of being used in radio resources that are the sum of radio resources to which the PHICH is mapped to and radio resources to which the E-PHICH is mapped.

In another aspect, there is provided user equipment. The UE include a radio frequency unit transmitting and receiving radio signals and a processor connected to the radio frequency unit. The processor receives information about the allocation of a control channel from a base station, sends uplink data to a node controlled by the base station, and receives an acknowledgement/not-acknowledgement (ACK/NACK) signal for the uplink data from the node based on the information about the allocation of the control channel. A subframe in which the ACK/NACK signal is received includes a plurality of Orthogonal Frequency Division Multiplexing (OFDM) symbols in a time domain and includes a plurality of resource blocks in a frequency domain, a physical hybrid-ARQ indicator channel (PHICH) is allocated to first N OFDM symbols within the subframe and an Enhanced-PHICH (E-PHICH) is allocated to at least one OFDM symbol subsequently to the first N OFDM symbols, the information about the allocation of the control channel includes information about the allocation of the E-PHICH, and the ACK/NACK signal is received through the E-PHICH. The N is a natural number of any one of 1 to 4.

In accordance with the present invention, in a wireless communication system, additional radio resources can be allocated and ACK/NACK can be transmitted. Accordingly, an HARQ can be performed efficiently although the number of terminals supported by a wireless communication system is increased.

DESCRIPTION OF EXEMPLARY EMBODIMENTS

The following technology can be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier-Frequency Division Multiple Access (SC-FDMA). CDMA can be implemented using radio technology, such as Universal Terrestrial Radio Access (UTRA) or CDMA2000. TDMA can be implemented by radio technology, such as Global System for Mobile communications (GSM)/General Packet Radio Service (GPRS)/Enhanced Data Rates for GSM Evolution (EDGE). OFDMA can be implemented by radio technology, such as IEEE 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with a system based on IEEE 802.16e. UTRA is part of a Universal Mobile Telecommunications System (UMTS). $3^{rd}$ Generation Partnership Project (3GPP) Long Term Evolution (LTE) is part of an Evolved UMTS (E-UMTS) using Evolved-UMTS Terrestrial Radio Access (E-UTRA). 3GPP LTE adopts OFDMA in downlink and adopts SC-FDMA in uplink. LTE-Advanced (A) is the evolution of 3GPP LTE. In order to clarify a description, a situation in which the present invention is applied to an LTE-A system is assumed, but the technical spirit of the present invention is not limited thereto.

Figure 1:
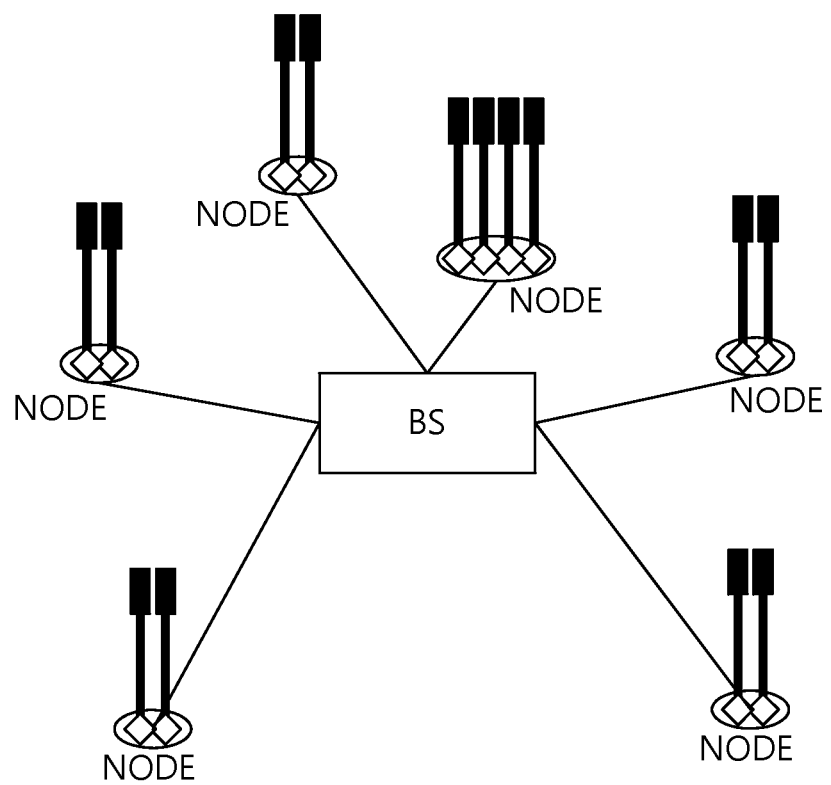
FIG. 1 shows an example of a multi-node system.

FIG. 1 shows an example of a multi-node system.

The multi-node system includes a Base Station (BS) and a plurality of nodes.

The BS provides communication service to a specific geographical area. The BS commonly refers to a fixed station that communicates with User Equipments (UEs), and the BS may also be called another term, such as an evolved-NodeB (eNB), a Base Transceiver System (BTS), or an Advanced Base Station (ABS).

In FIG. 1, a node can be implemented by a macro eNodeB, a pico-cell eNB, a home eNB, an RRH, an RRU, a relay node, an antenna, or an antenna group. A node is also called a point. This node can be connected to a BS in a wired or wireless way and controlled/managed by the BS From a viewpoint of UE, a node can be identified or indicated through a Reference Signal (RS) or a pilot signal. The RS (or pilot signal, this is the same hereinafter) is a signal known to a transmission terminal and a reception terminal, and the RS means a signal used in channel measurement, data demodulation, etc. An RS includes, for example, a Common Reference Signal (CRS) regulated in 3GPP LTE-A, a Channel State Indication-Reference Signal (CSI-RS), a preamble regulated in IEEE 802.16m, a midamble, etc. This RS and a configuration for the RS can be mapped to each node (or the transmission antenna of each node). If information about a configuration for an RS and mapping between nodes is given to UE or previously known to the UE, the UE can identify the nodes or the UE can be informed of the nodes and the UE can obtain channel state information about a corresponding node based on the configuration for an RS. The RS configuration can include information about a configuration index, the number of antenna ports of each node, Resource Elements (REs) being used, a transmission cycle, an offset of a transmission time point, etc. Accordingly, in this specification, a description in which UE measures a signal for a specific node or generates channel state information can mean that the UE measures a signal for a specific RS or generates channel state information.

Referring to back to FIG. 1, the nodes are connected to the BS in a wired/wireless way. Each of the nodes can include one antenna or a plurality of antennas (i.e., an antenna group). Antennas belonging to one node are placed within several meters geographically, and they can have the same characteristic. In a multi-node system, a node functions as an Access Point (AP) accessible to UE.

If a node is formed of antennas as described above, this multi-node system is also called a Distributed Antenna System (DAS). That is, a DAS refers to a system in which antennas (i.e., nodes) are geographically distributed and deployed at various positions and the antennas are managed by a BS. A DAS differs from a conventional Centralized Antenna System (CAS) in that the antennas of a BS are localized and placed at the center of a cell.

Here, the meaning that antennas are geographically distributed and deployed can mean that one receiver and a plurality of antennas are deployed so that a difference in the channel status between each of the antennas and the receiver is a specific value or higher when the one receiver receives the same signal from the plurality of antennas. The meaning that antennas are localized and deployed can mean that the antennas are densely deployed so that a difference in the channel status between each of the antennas and one receiver is less than a specific value. The specific value can be determined in various ways depending on a frequency and the type of service used in antennas.

In general, downlink means communication from a BS or a node to UE, and uplink means communication from UE to a BS or a node. In downlink or uplink, communication can be performed using a radio frame.

Figure 2:
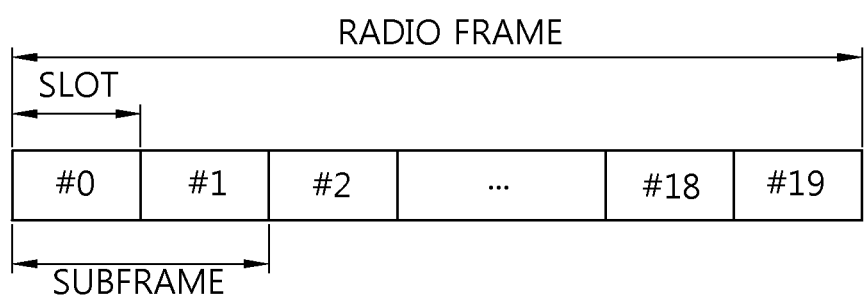
FIG. 2 shows the structure of a radio frame in 3GPP LTE.

FIG. 2 shows the structure of a radio frame in 3GPP LTE.

Referring to FIG. 2, the radio frame includes 10 subframes, and each of the subframes includes 2 slots. The slots within the radio frame are given slot numbers from #0 to #19. The time that is taken for one subframe to be transmitted is called a Transmission Time Interval (TTI). The TTI can be called a scheduling unit for data transmission. For example, the length of one radio frame can be 10 ms, the length of one subframe can be 1 ms, and the length of one slot can be 0.5 ms.

The structure of the radio frame is only an example. Accordingly, the number of subframes included in the radio frame or the number of slots included in the subframe can be changed in various ways.

Figure 3:
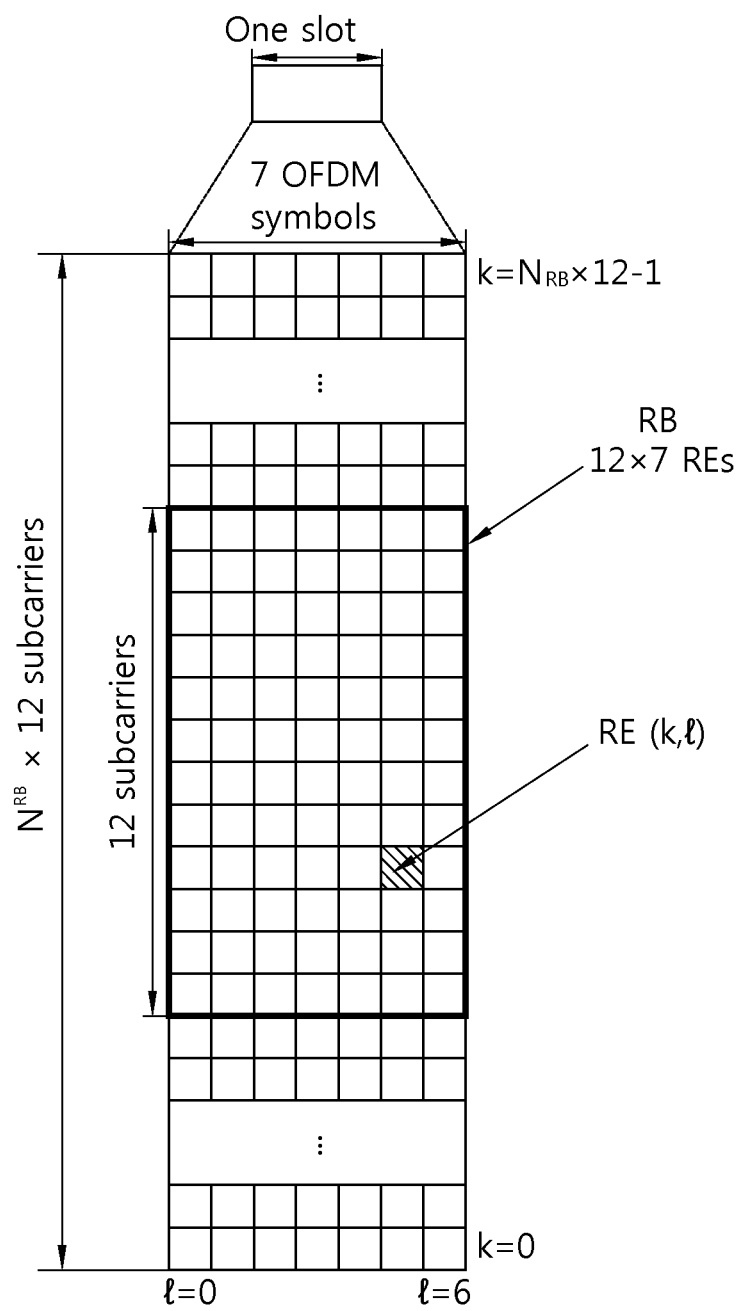
FIG. 3 shows an example of a resource grid for one slot.

FIG. 3 shows an example of a resource grid for one slot.

The slot includes a downlink slot and an uplink slot. The downlink slot includes a plurality of Orthogonal Frequency Division Multiplexing (OFDM) symbols in a time domain. The OFDM symbol indicates a specific time interval, and the OFDM symbol may also be called an SC-FDMA symbol depending on a transmission method. The downlink slot includes an $N_{RB}$ number of Resource Blocks (RBs) in a frequency domain. The RB is a resource allocation unit, and the RB includes one slot in the time domain and a plurality of contiguous subcarriers in the frequency domain.

The number of RBs $N_{RB}$ included in the downlink slot depends on a downlink transmission bandwidth configured in a cell. For example, in an LTE system, the number $N_{RB}$ can be any one of 6 to 110. An uplink slot can have the same structure as the downlink slot.

Each element on the resource grid is called a Resource Element (RE). An RE on the resource grid can be identified by an index pair (k,l) within a slot. Here, k (k=0, . . . , $N_{RB} \times 12-1$) is a subcarrier index within the frequency domain, and l (l=0, . . . , 6) is an OFDM symbol index within the time domain.

One RB is illustrated as including 7×12 REs, including 7 OFDM symbols in the time domain and 12 subcarriers in the frequency domain, but the number of OFDM symbols and the number of subcarriers within one RB are not limited thereto. The number of OFDM symbols and the number of subcarriers can be changed in various ways depending on the length of a CP, frequency spacing, etc. For example, in the case of a normal Cyclic Prefix (CP), the number of OFDM symbols is 7 and in the case of an extended CP, the number of OFDM symbols is 6. In one OFDM symbol, one of 128, 256, 512, 1024, 1536, and 2048 can be selected and used as the number of subcarriers.

Figure 4:
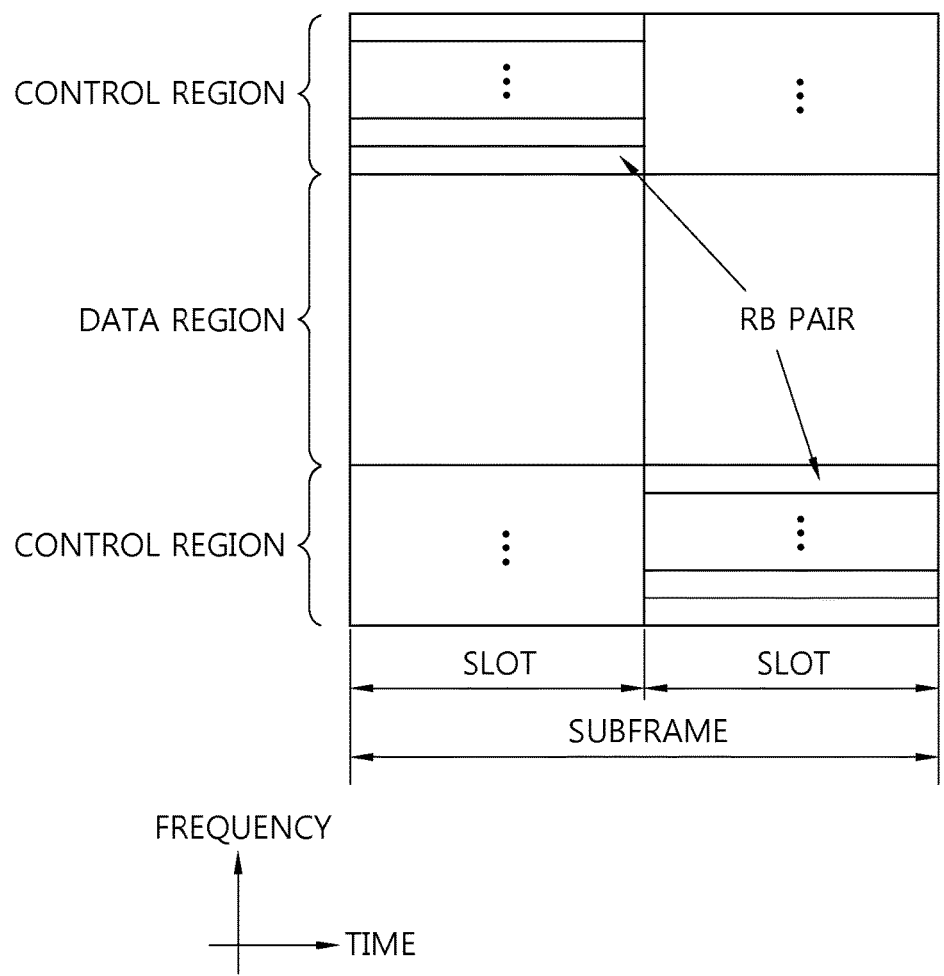
FIG. 4 shows the structure of an uplink subframe.

FIG. 4 shows the structure of an uplink subframe.

The uplink subframe can be divided into a control region and a data region in a frequency domain. Physical uplink control channels (PUCCHs) on which uplink control information is transmitted are allocated to the control region. Physical uplink shared channels (PUSCHs) through which data is transmitted are allocated to the data region. A terminal may send or may not send a PUCCH and a PUSCH at the same time depending on a configuration.

A PUCCH for one terminal is allocated as an RB pair in a subframe. RBs belonging to the RB pair occupy different subcarriers in a first slot and a second slot. A frequency occupied by RBs that belong to an RB pair allocated to a PUCCH is changed on the basis of a slot boundary. This is called that the RB pair allocated to the PUCCH has been frequency-hopped in the slot boundary. A terminal can obtain a frequency diversity gain by sending uplink control information through different subcarriers over time.

Uplink control information transmitted on a PUCCH includes ACK/NACK, Channel State Information (CSI) indicative of a downlink channel state, a Scheduling Request (SR), that is, an uplink radio resource allocation request, etc. The CSI includes a Precoding Matrix Index (PMI) indicative of a precoding matrix, a Rank Indicator (RI) indicative of a rank value that is preferred by UE, a Channel Quality Indicator (CQI) indicative of a channel state, etc.

A PUSCH is mapped to an uplink shared channel (UL-SCH), that is, a transport channel. Uplink data transmitted on the PUSCH can be a transmission block, that is, a data block for an UL-SCH that is transmitted during a TTI. The transmission block can be user information. Alternatively, the uplink data can be multiplexed data. The multiplexed data can be obtained by multiplexing the transmission block for the UL-SCH and control information. For example, control information multiplexed with data can include a CQI, a PMI, ACK/NACK, an RI, etc. Alternatively, the uplink data may include only control information.

Figure 5:
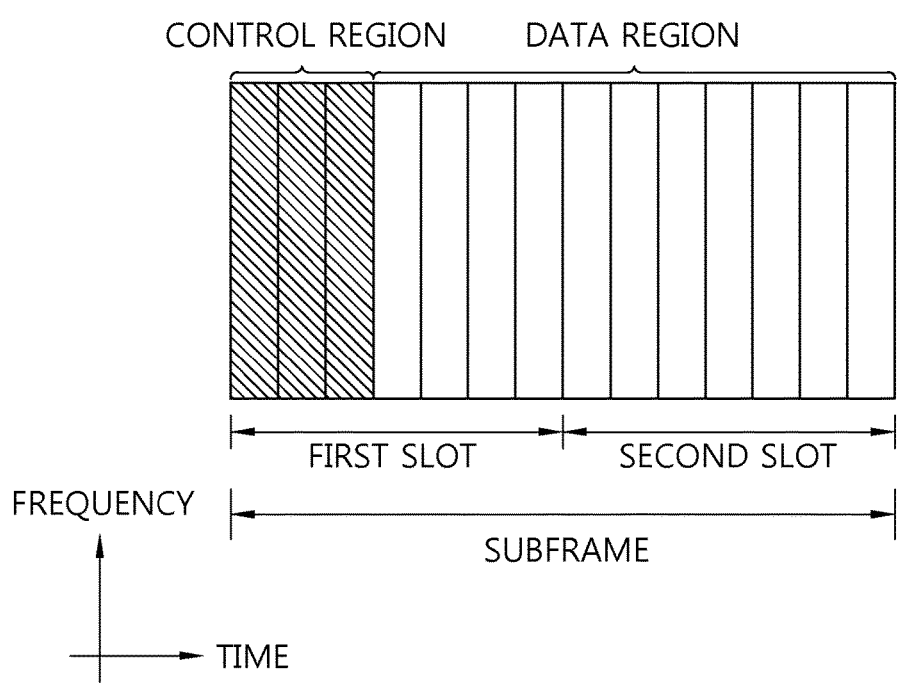
FIG. 5 shows the structure of a downlink subframe.

FIG. 5 shows the structure of a downlink subframe.

The downlink subframe includes two slots in a time domain, and each of the slots includes 7 OFDM symbols in a normal CP. A maximum of former 3 OFDM symbols (i.e., a maximum of 4 OFDM symbols for a 1.4 MHz bandwidth) in the first slot within the downlink subframe corresponds to a control region to which control channels are allocated, and the remaining OFDM symbols correspond to a data region to which Physical Downlink Shared Channels (PDSCHs) are allocated. The PDSCH means a channel on which data is transmitted from a BS or a node to UE.

Control channels transmitted in the control region include a physical control format indicator channel (PCFICH), a physical hybrid-ARQ indicator channel (PHICH), and a physical downlink control channel (PDCCH).

A PCFICH transmitted in the first OFDM symbol of the subframe carries a Control Format Indicator (CFI), that is, information about the number of OFDM symbols (i.e., the size of the control region) that is used to send control channels within the subframe. A terminal first receives a CFI on a PCFICH and then decodes a PDCCH. Unlike a PDCCH, a PCFICH does not use blind decoding, and the PCFICH is transmitted through the fixed PCFICH resource of a subframe.

A PHICH carries an acknowledgement (ACK)/not-acknowledgement (NACK) signal for an uplink Hybrid Automatic Repeat request (HARQ). An ACK/NACK signal for uplink data transmitted by UE is transmitted through a PHICH. The PHICH is described in detail later.

A PDCCH is a control channel on which Downlink Control Information (DCI) is transmitted. The DCI can include the allocation of PDSCH resources (also called downlink grant (DL grant)), the allocation of physical uplink shared channel (PUSCH) resources (also called an uplink grant (UL grant)), a set of transmit power control commands for individual UEs within a specific terminal group and/or the activation of a Voice over Internet Protocol (VoIP).

Figure 6:
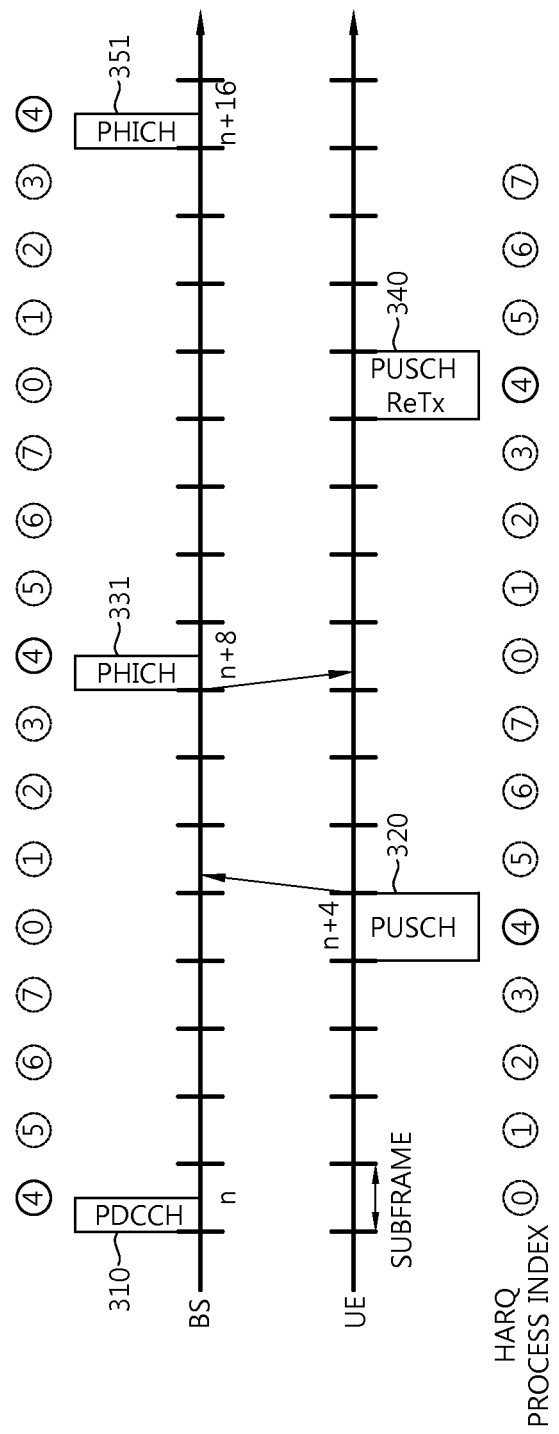
FIG. 6 shows an example of a method of performing an uplink HARQ.

FIG. 6 shows an example of a method of performing an uplink HARQ.

A terminal receives the allocation of initial uplink resources on a PDCCH 310 in an $n^{th}$ subframe from a BS.

The terminal sends uplink data, more particularly, an uplink transmission block on a PUSCH 320 in an $(n+4)^{th}$ subframe using the allocation of the initial uplink resources.

The BS sends an ACK/NACK signal for the uplink transmission block on a PHICH 331 in an $(n+8)^{th}$ subframe. The ACK/NACK signal indicates the confirmation of the reception of the uplink transmission block, the ACK signal indicates successful reception, and the NACK signal indicates unsuccessful reception.

The terminal which has received the NACK signal sends a retransmission block on a PUSCH 340 in an $(n+12)^{th}$ subframe.

The BS sends an ACK/NACK signal for the uplink transmission block on a PHICH 351 in an $(n+16)^{th}$ subframe.

After initial transmission in the $(n+4)^{th}$ subframe, the retransmission is performed in the $(n+12)^{th}$ subframe. Accordingly, an HARQ is performed using 8 subframes as an HARQ cycle.

In 3GPP LTE, 8 HARQ processes can be performed. The HARQ processes are assigned indices from 0 to 7. The aforementioned example shows that an HARQ in an HARQ process index 4.

A PHICH is described in detail below.

As described above, a PHICH is a control channel that carries an ACK/NACK signal for uplink data transmitted by UE. A plurality of PHICHs can be mapped to a set of the same resource elements that form a PHICH group. The PHICHs within the same PHICH group are distinguished by different orthogonal sequences. A resource on which a PHICH is transmitted is called a PHICH resource. The PHICH resource is identified by an index pair, such as $(n^{group}_{PHICH}, n^{seq}_{PHICH})$. $n^{group}_{PHICH}$ indicates a PHICH group index, and $n^{seq}_{PHICH}$ indicates an index of an orthogonal sequence within the PHICH group.

The following equation indicates an index pair indicative of a PHICH resource.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$ [Equation 1]

In Equation 1, $I_{PRB\_RA}^{lowest\_index}$ is a minimum Physical Resource Block (PRB) index of the first slot of a corresponding PUSCH, and $n_{DMRS}$ is a value indicative of the cyclic shift of a demodulation reference signal (DMRS) in the corresponding PUSCH. The DMRS refers to an RS used to demodulate data that is transmitted on a PUSCH. Furthermore, $N^{group}_{PHICH}$ indicates the number of PHICH groups, $N^{PHICH}_{SF}$ indicates a spreading factor for PHICH demodulation, and $I_{PHICH}$ is a value having 1 or 0. PUSCH transmission is performed in a subframe n=4 or 9 (n is one of 0 to 9, and n is 4 or 9). If a Time Division Duplex (TDD) uplink-downlink configuration (UL-DL configuration) is 0, $I_{PHICH}$ is 1. In other cases, $I_{PHICH}$ is 0.

In a radio frame used in Frequency Division Duplex (FDD), the number of PHICH groups $N^{group}_{PHICH}$ is a constant regarding all subframes and given as follows.

$$N_{PHICH}^{group} = \begin{cases} \lceil N_g (N_{RB}^{DL}/8) \rceil & \text{for normal cyclic prefix} \\ 2 \cdot \lceil N_g (N_{RB}^{DL}/8) \rceil & \text{for extended cyclic prefix} \end{cases}$$ [Equation 2]

Here, $N_g \in \{1/6, 1/2, 1, 2\}$ and is given through a higher layer signal. An index $n^{group}_{PHICH}$ in Equation 1 has a range from 0 to $N^{group}_{PHICH} - 1$.

In a radio frame used in Time Division Duplex (TDD), the number of PHICH groups can be changed in various ways between downlink subframes. The number of PHICH groups can be given as '$m_i \cdot N^{group}_{PHICH}$'. $m_i$ can be given as in the following table. Furthermore, $N^{group}_{PHICH}$ can be given as in Equation 2, and an index $n^{group}_{PHICH}$ can have a range of 0 to $m_i \cdot N^{group}_{PHICH} - 1$ in relation to a downlink subframe having a PHICH resource.

TABLE 1

| UL-DL configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

Figure 7:
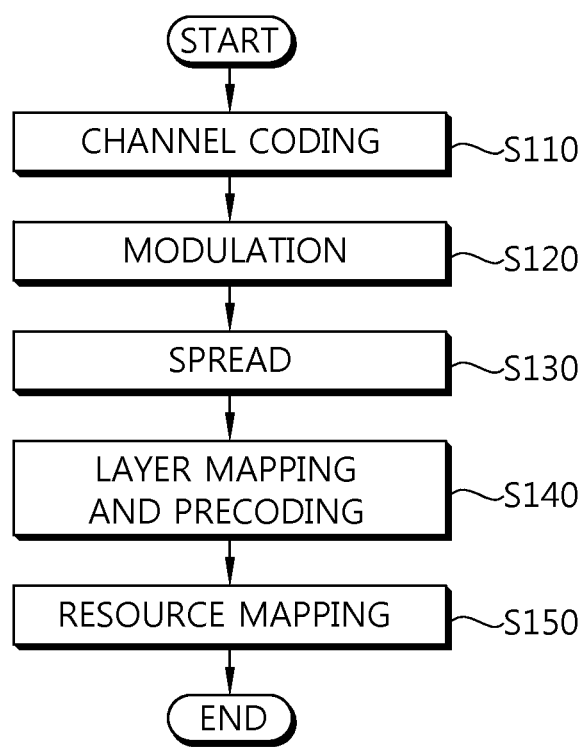
FIG. 7 shows an example of a process of configuring PHICHs.

FIG. 7 shows an example of a process of configuring PHICHs.

At step S110, channel coding is performed on an ACK/NACK signal using repetition coding according to a coding rate.

At step S120, the channel-coded ACK/NACK signal is mapped to modulation symbols through Binary Phase Shift Keying (BPSK) modulation. At step S130, the modulation symbols are spread using a Spreading Factor (SF) $N^{PHICH}_{SF}$ and an orthogonal sequence.

For example, if a bit stream to be transmitted through one PHICH within one subframe is b(0), . . . , b($M_{bit}$−1), the bit stream is subject to Binary Phase Shift Keying (BPSK) modulation and thus generated into modulation symbols z(0), . . . , z($M_g$−1) having a complex value. Here, $M_s = M_{bit}$.

The modulation symbols z(0), . . . , z($M_s$−1) are multiplied by an orthogonal sequence symbol-wise as in the following equation and scrambled, so modulation symbols d(0), . . . , d($M_{symb}$−1) are generated as in the following equation.

$$d(i) = w(i \bmod N^{PHICH}_{SF}) \cdot (1 - 2c(i)) \cdot z(\lfloor i/N^{PHICH}_{SF} \rfloor) \quad \text{[Equation 3]}$$

$$i = 0, \ldots, M_{symb} - 1$$

$$M_{symb} = N^{PHICH}_{SF} \cdot M_s$$

where $$N^{PHICH}_{SF} = \begin{cases} 4 & \text{normal cyclic prefix} \\ 2 & \text{extended cyclic prefix} \end{cases}$$

Furthermore, c(i) is a cell-specific scrambling sequence and can be given as in Paragraph 7.2 of 3GPP TS 36.211 V9.1.0. An initial value $c_{init}$ of c(i) for each subframe is given as in the following equation.

$$c_{init} = (\lfloor n_s/2 \rfloor + 1) \cdot (2N^{cell}_{ID} + 1) \cdot 2^9 + N^{cell}_{ID} \quad \text{[Equation 4]}$$

In Equation 4, $N^{cell}_{ID}$ indicates a physical layer cell ID, and $n_s$ indicates a slot number within a radio frame.

An orthogonal sequence [w(0) . . . w($N^{PHICH}_{SF}$−1)] used to spread a PHICH is given as in the following table. Here, $n^{seq}_{PHICH}$ corresponds to a PHICH number within a PHICH group.

TABLE 2

| Sequence index $n^{seq}_{PHICH}$ | Orthogonal sequence Normal cyclic prefix $N^{PHICH}_{SF} = 4$ | Orthogonal sequence Extended cyclic prefix $N^{PHICH}_{SF} = 2$ |
| --- | --- | --- |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Referring back to FIG. 7, at step S140, the spread symbols are subject to layer mapped according to the rank and then precoded.

That is, the modulation symbols d(0), . . . , d($M_{symb}$−1) are first aligned according to a RE group size, so $d^{(0)}(0)$, . . . , $d^{(0)}(c \cdot M_{symb}$−1) are generated. Here, c is 1 in a normal CP and 2 in an extended CP. In the case of a normal CP, $d^{(0)}(i) = d(i)$, and i=0, . . . , $M_{symb}$−1. In the case of an extended CP, the following equation is obtained.

$$[d^{(0)}(4i) \; d^{(0)}(4i+1) \; d^{(0)}(4i+2) \; d^{(0)}(4i+3)]^T = \begin{cases} [d(2i) \; d(2i+1) \; 0 \; 0]^T & n^{group}_{PHICH} \bmod 2 = 0 \\ [0 \; 0 \; d(2i) \; d(2i+1)]^T & n^{group}_{PHICH} \bmod 2 = 1 \end{cases} \quad \text{[Equation 5]}$$

In Equation 5, $i = 0, \ldots, (M_{symb}/2) - 1$.

The modulation symbols $d^{(0)}(0), \ldots, d^{(0)}(c \cdot M_{symb}-1)$ are mapped to layers and precoded, so a vector, such as the following equation is generated.

$$y(i) = [y^{(0)}(i) \ldots y^{(P-1)}(i)]^T, \; i=0, \ldots, c \cdot M_{symb}-1 \quad \text{[Equation 6]}$$

In Equation 6, $y^{(p)}(i)$ indicates a signal for an antenna port p. Furthermore, p=0, . . . , P−1. P indicates the number of cell-specific RSs, and P∈ {1, 2, 4}.

The layer mapping and precoding are dependent on the length of a CP and the number of antenna ports used in PHICH transmission. The PHICH can be transmitted on the same antenna port set as a physical broadcast channel (PBCH).

Regarding transmission using a single antenna port (i.e., P=1), layer mapping and precoding can be performed according to Paragraphs 6.3.3.1 and 6.3.4.1 of 3GPP TS 36.211 V9.1.0. Here, $M^{(0)}_{symb} = c \cdot M_{symb}$.

Regarding transmission using 2 antenna ports (i.e., P=2), layer mapping and precoding can be performed according to Paragraphs 6.3.3.3 and 6.3.4.3 of 3GPP TS 36.211 V9.1.0. Here, $M^{(0)}_{symb} = c \cdot M_{symb}$.

Regarding transmission using 4 antenna ports (i.e., P=4), layer mapping can be performed according to Paragraph 6.3.3.3 of 3GPP TS 36.211 V9.1.0. Here, $M^{(0)}_{symb} = c \cdot M_{symb}$. Furthermore, precoding is performed as in Table 3 below.

TABLE 3

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \\ 0 & 0 & 0 & 0 & 0 & 0 & 0 & 0 \end{bmatrix} \begin{bmatrix} \operatorname{Re}(x^{(0)}(i)) \\ \operatorname{Re}(x^{(1)}(i)) \\ \operatorname{Re}(x^{(2)}(i)) \\ \operatorname{Re}(x^{(3)}(i)) \\ \operatorname{Im}(x^{(0)}(i)) \\ \operatorname{Im}(x^{(1)}(i)) \\ \operatorname{Im}(x^{(2)}(i)) \\ \operatorname{Im}(x^{(3)}(i)) \end{bmatrix}$$

Table 3 corresponds to the case where $(i + n^{group}_{PHICH}) \bmod 2 = 0$ in a normal CP or Equation 7 below is satisfied in an extended CP. $n^{group}_{PHICH}$ is a PHICH group number, and i=0, 1, 2. 'mod' refers to a modulus operation.

$$(i + \lfloor n^{group}_{PHICH}/2 \rfloor) \bmod 2 = 0 \quad \text{[Equation 7]}$$

In other cases, precoding is performed as in Table 4 below.

TABLE 4

$$
\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \frac{1}{\sqrt{2}} \begin{bmatrix} 0 & 0 & 0 & 0 & 0 & 0 & 0 & 0 \\ 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} Re(x^{(0)}(i)) \\ Re(x^{(1)}(i)) \\ Re(x^{(2)}(i)) \\ Re(x^{(3)}(i)) \\ Im(x^{(0)}(i)) \\ Im(x^{(1)}(i)) \\ Im(x^{(2)}(i)) \\ Im(x^{(3)}(i)) \end{bmatrix}
$$

Referring back to FIG. 7, at step S150, the layer-mapped symbols are mapped to respective REs.

For example, a sequence for each PHICH group can be defined as in the following equation.

$$\bar{y}^{(p)}(n) = \Sigma y_i^{(p)}(n) \quad \text{[Equation 8]}$$

An addition operation of Equation 8 is performed on all the PHICHs within the PHICH group, and $y^{(p)}_i(n)$ indicates a symbol sequence for an $i^{th}$ PHICH within the PHICH group.

The PHICH groups are mapped to PHICH mapping units.

In the case of a normal CP, the mapping of a PHICH group m to a PHICH mapping unit m' is defined as in the following equation. A frame structure type 1 is a frame used in FDD, and a frame structure type 2 is a frame used in TDD. For the frame structure types, reference can be made to section 4 of 3GPP TS 36. 211 V8.6.0 (2009-03).

$$\tilde{y}_{m'}^{(p)}(n) = \bar{y}_m^{(p)}(n) \quad \text{[Equation 9]}$$

$$m' = m = \begin{cases} 0, 1, \ldots, N_{PHICH}^{group} - 1 & \text{for frame structure type 1} \\ 0, 1, \ldots, m_i \cdot N_{PHICH}^{group} - 1 & \text{for frame structure type 2} \end{cases}$$

In the case of an extended CP, the mapping of PHICH groups m and m+1 to the PHICH mapping unit m' is defined as in the following equation.

$$\tilde{y}_{m'}^{(p)}(n) = \bar{y}_m^{(p)}(n) + \bar{y}_{m+1}^{(p)}(n) \quad \text{[Equation 10]}$$

$$m' = m/2$$

$$m = \begin{cases} 0, 2, \ldots, N_{PHICH}^{group} - 2 & \text{for frame structure type 1} \\ 0, 2, \ldots, m_i \cdot N_{PHICH}^{group} - 2 & \text{for frame structure type 2} \end{cases}$$

In Equations 9 and 10, m, is given by Table 1.

For example, it is assumed that $z^{(p)}(i)$ indicates '4 symbols' (i.e., symbol quadruplet) i, such as Equation 11 below for an antenna port p.

$$z^{(p)}(i) = \langle \tilde{y}^{(p)}(4i), \tilde{y}^{(p)}(4i+1), \tilde{y}^{(p)}(4i+2), \tilde{y}^{(p)}(4i+3) \rangle \quad \text{[Equation 11]}$$

It can be defined that mapping to REs is performed through the following step using the 4 symbols.

Step 1: for each 1' value

Step 2: it is assumed that $n_{1'}$ is the number of RE groups not allocated to a PCFICH in an OFDM symbol 1'.

Step 3: the RE groups not allocated to a PCFICH in the OFDM symbol 1' are numbered from 0 to $n_{1'}-1$ starting from an RE group having an index of the lowest frequency domain.

Step 4: m' is reset to 0. That is, a PHICH mapping unit number is reset.

Step 5: i=0, 1, 2, for each value

Step 6: 4 symbols $z^{(p)}(i)$ from the PHICH mapping unit m' are mapped to an RE group indicated by $(k', l')_i$. Here, $l'_i$ is a time domain index, and $k'_i$ is a frequency domain index. $k'_i$ and $l'_i$ can be given as in the following equation. In Equation 12, normal PHICH duration and extended PHICH duration comply with Table 5.

$$l'_i = \begin{cases} 0 & \text{normal PHICH duration, all subframes} \\ (\lfloor m'/2 \rfloor + i + 1) \bmod 2 & \text{extended PHICH duration, MBSFN subframes} \\ (\lfloor m'/2 \rfloor + i + 1) \bmod 2 & \text{extended PHICH duration, subframe 1 and 6 in frame structure type 2} \\ i & \text{otherwise} \end{cases} \quad \text{[Equation 12]}$$

The frequency domain index $k'_i$ is set to an RE group to which $\bar{n}_i$ has been allocated. $\bar{n}_i$ is given as in Equation 13 or Equation 14. Equation 13 regulates $\bar{n}_i$ in relation to extended PHICH duration in the subframes 1 and 6 of a radio frame used in TDD or extended PHICH duration in an MBSFN subframe.

$$\bar{n}_i = \begin{cases} (\lfloor N_{ID}^{cell} \cdot n_{l'_i}/n_1 \rfloor + m') \bmod n_{l'_i} & i = 0 \\ (\lfloor N_{ID}^{cell} \cdot n_{l'_i}/n_1 \rfloor + m' + \lfloor n_{l'_i}/3 \rfloor) \bmod n_{l'_i} & i = 1 \\ (\lfloor N_{ID}^{cell} \cdot n_{l'_i}/n_1 \rfloor + m' + \lfloor 2n_{l'_i}/3 \rfloor) \bmod n_{l'_i} & i = 2 \end{cases} \quad \text{[Equation 13]}$$

In other cases, $\bar{n}_i$ is given as in Equation 14.

$$\bar{n}_i = \begin{cases} (\lfloor N_{ID}^{cell} \cdot n_{l'_i}/n_0 \rfloor + m') \bmod n_{l'_i} & i = 0 \\ (\lfloor N_{ID}^{cell} \cdot n_{l'_i}/n_0 \rfloor + m' + \lfloor n_{l'_i}/3 \rfloor) \bmod n_{l'_i} & i = 1 \\ (\lfloor N_{ID}^{cell} \cdot n_{l'_i}/n_0 \rfloor + m' + \lfloor 2n_{l'_i}/3 \rfloor) \bmod n_{l'_i} & i = 2 \end{cases} \quad \text{[Equation 14]}$$

Step 7: m' is increased by 1.

Step 8: Steps 5 to 7 are repeated until all PHICH mapping units are allocated.

The PHICH duration is configured as in the following table in response to a higher layer signal. The PHICH duration indicates the number of OFDM symbols used to send a PHICH.

TABLE 5

| | Non-MBSFN subframes | | MBSFN subframes |
|---|---|---|---|
| PHICH duration | Subframes 1 and 6 (TDD radio frame) | All other cases | on a carrier supporting PDSCH |
| Normal | 1 | 1 | 1 |
| Extended | 2 | 3 | 2 |

Figure 8:
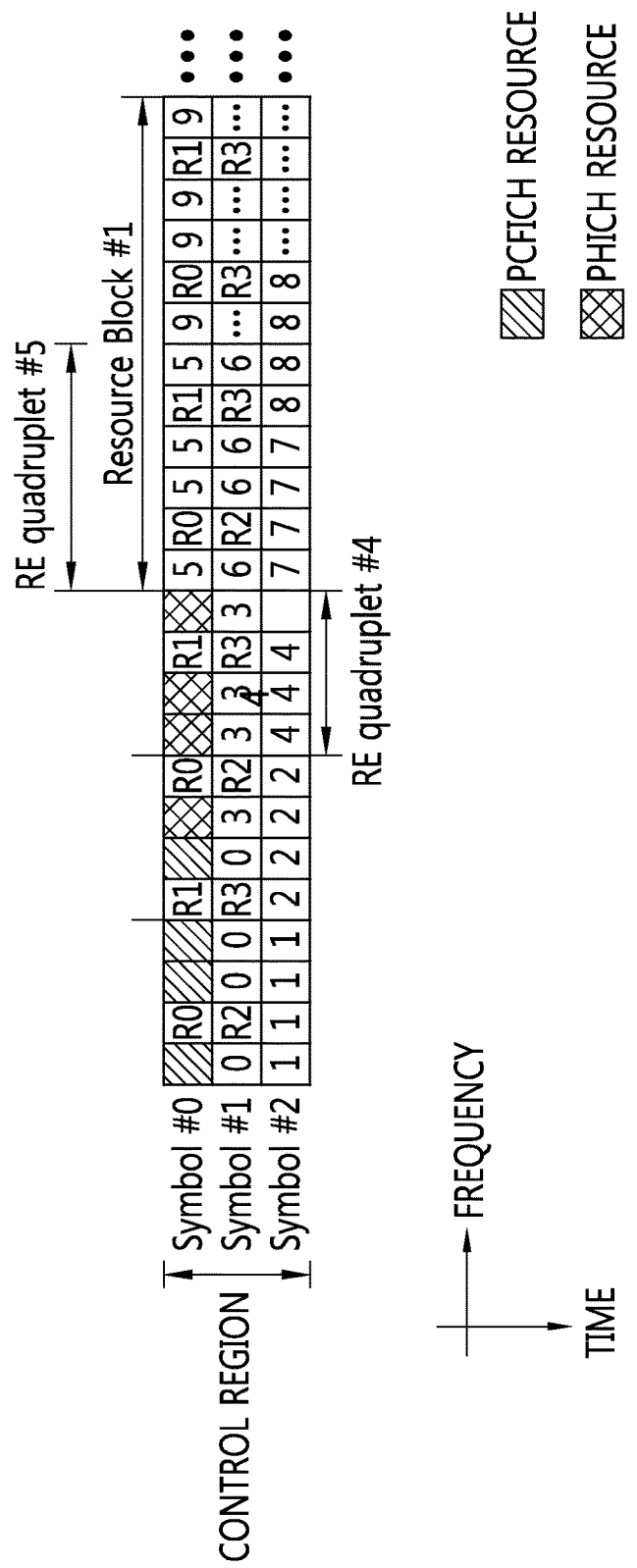
FIG. 8 shows an example in which control channels are mapped to the control region of a downlink subframe.

FIG. 8 shows an example in which control channels are mapped to the control region of a downlink subframe.

In FIG. 8, R0 indicates the reference signal of an antenna port #0, R1 indicates the reference signal of an antenna port #1, R2 indicates the reference signal of an antenna port #2, and R3 indicates the reference signal of an antenna port #3.

The control region includes a plurality of Control Channel Elements (CCEs). The CCE is a logical allocating unit used to provide a coding rate according to the state of a radio channel and can be formed of a plurality of Resource Element Groups (REGs). For example, one CCE can include 9 REGs. One REG is also indicated by an RE quadruplet because it includes 4 Resource Elements (REs). The four REs included in one REG may be contiguous or may not be contiguous to each other. A PHICH can be allocated and mapped by the CCE (or REG) in the first OFDM symbol of a subframe in a normal CP.

A method of allocating/transmitting a PHICH on which a BS or a node sends an ACK/NACK signal in a wireless communication system is described below. An example in which the present invention is chiefly applied to a multi-node system is described below, but the present invention is not limited thereto. That is, the present invention can be applied to a specific wireless communication system other than a multi-node system.

In downlink, information transmitted from a BS to UE can be divided into 1. Information for all UEs within the coverage of the BS and 2. Information for a specific terminal. For example, system parameters, such as a cell identity (ID) and the number of antennas of a BS, can be said to be information for all UEs. In contrast, control information for each terminal, such as uplink transmission power control information, ACK/NACK, data requested by UE, etc can be said to be information for a specific terminal.

In general, the information for all UEs is transmitted at a defined location of a specific channel so that all the UEs can access the information. For example, a PBCH and a PCFICH in LTE/LTE-A, a Frame Control Header (FCH)/SuperFrame Header (SFH) in IEEE 802.16e/m, etc. are channels on which information for all UEs within a cell is transmitted. The information for all UEs that is transmitted through the channels is defined to use designated time and frequency resources.

In contrast, control information for a specific terminal or a specific terminal group (i.e., UE-specific control information) is transmitted using a different time and a different frequency resource except that a Multi-User Multi Input Multi Output (MU-MIMO) scheme is used.

Accordingly, each terminal requires map information indicating that corresponding information has been mapped to what resource region in order to access its information. This map information is transmitted through, for example, DL-MAP, UL-MAP, or Advanced (A)-MAP in IEEE 802.16e/m and is transmitted through a PDCCH in LTE/LTE-A.

The above-described map information can be transmitted through a control channel. A radio resource region in which a control channel can be transmitted as described above is called a control region. The above-described PDCCH and A-MAP can be called control channels, and time/frequency resources to which the PDCCH and the A-MAP can be allocated are called control regions.

Meanwhile, in a multi-node system, one BS or nodes within a cell may need to send different pieces of control information in the same control region. That is, it is necessary to send different control information to each terminal by the node. To this end, pieces of control information for a plurality of UEs may be multiplexed with one control channel. Alternatively, a control channel for each of a plurality of UEs may be configured, and a plurality of the control channels may be multiplexed with a control region and then transmitted.

Alternatively, a control region different from a control region that is used by legacy UEs may be added, and control information for an advanced terminal may be transmitted in the added control region. The added control region can be designed so that it is received by only an advanced terminal using an RS that is not used by a legacy terminal. A high system capacity can be secured because several advanced UEs can share the same control region or control channel.

For example, the added control region can be added to an existing region to which a PDCCH, a PHICH, or a PCFICH is allocated, that is, after the first 1 to 3 symbols of each subframe or to a PDSCH region. A control channel transmitted in the added control region can be regulated so that it is received using an RS, for example, a UE-specific RS not a CRS.

If a UE-specific RS is used, the MU-MIMO transmission of a control channel is possible and thus a plurality of UEs can share the same time/frequency resources, thereby increasing the efficiency of the control channel.

A control region added to an existing control region (e.g., control region used in LTE) is hereinafter referred to as an Enhanced (E)-control region. The E-control region may also be called an RRH control region in a sense of a control region in which different control information for each node, such as an RRH, can be transmitted. That is, the E-control region can mean a radio resource region in which different control information for each node of a multi-node system can be transmitted. Alternatively, the E-control region may be a radio resource region that is added in order to send increased control information in an existing wireless communication system.

Figure 9:
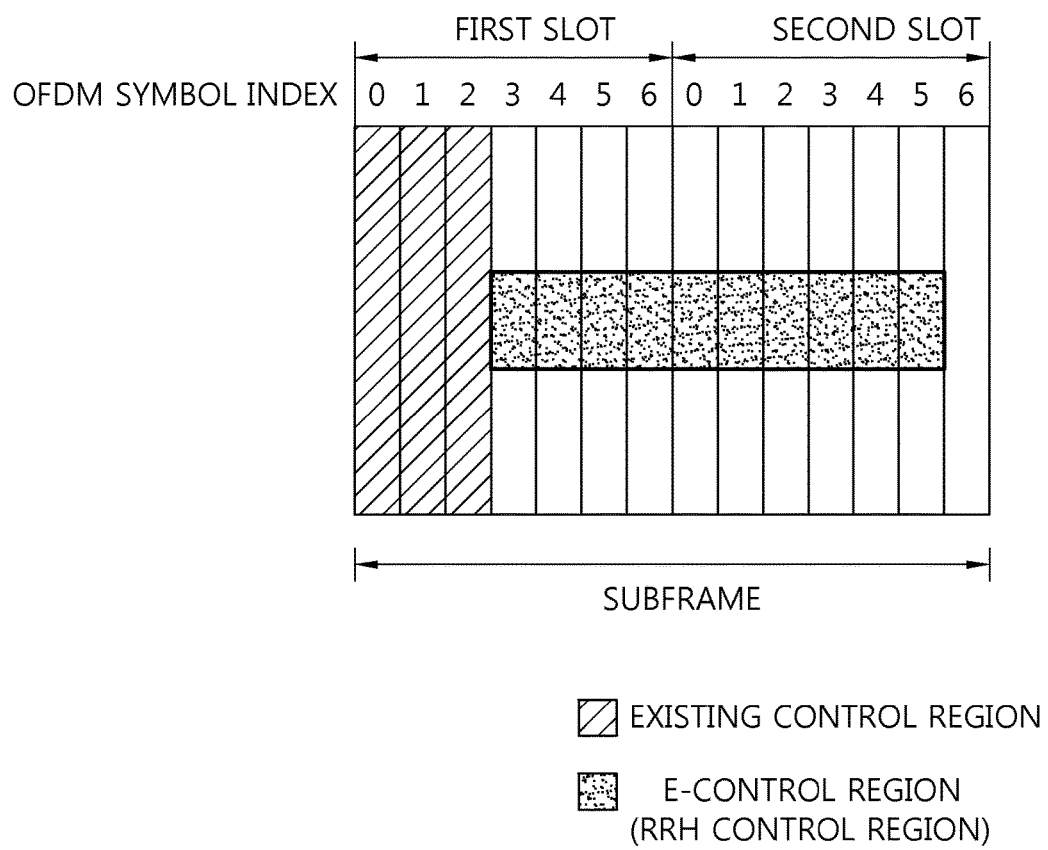
FIG. 9 shows an E-control region added in accordance with an embodiment of the present invention.

FIG. 9 shows an E-control region added in accordance with an embodiment of the present invention.

Referring to FIG. 9, the E-control region can be placed next to an existing control region in a time domain. For example, if an existing control region is transmitted in the first 3 OFDM symbols of a subframe, an E-control region can be added to OFDM symbols placed subsequently to the first 3 OFDM symbols. In a frequency domain, the existing control region and the E-control region may be configured identically or differently. FIG. 9 shows an example in which the E-control region is configured in only some frequency bands of the existing control region.

A signal for advanced UE can be transmitted in the E-control region. The advanced terminal means UE capable of signal transmission and reception according to the present invention. An existing terminal means UE that operates in accordance with the current communication standards. In other words, an existing terminal may be a first type terminal that operates in accordance with first Radio Access Technology (RAT), for example, 3GPP LTE Rel-10, and an advanced terminal may be a second type terminal that operates in accordance with second RAT, for example, 3GPP LTE Rel-11. Here, the second RAT can be the evolution of the first RAT.

For example, a control channel for an advanced terminal can be transmitted in the E-control region. The control channel for an advanced terminal is called an E-control channel so that it is distinguished from a control channel for an existing terminal. The E-control channel includes an E-PDCCH, an E-PCFICH, an E-PHICH, etc. Hereinafter, a PDCCH, a PCFICH, and a PHICH mean existing control channels, and an E-PDCCH, an E-PCFICH, and an E-PHICH mean control channels added according to the present invention.

For example, if the number of UEs is increased in a multi-node system, only existing PHICH resources may not be sufficient. That is, only existing defined PHICH resources may not be sufficient as resources for sending ACK/NACK information about the uplink transmission of an advanced terminal, or PHICH resources may need to be added to radio resources in addition to the existing PHICH resources in order to support the MU-MIMO transmission of a PUSCH. To this end, the added PHICH can be called an E-PHICH.

Hereinafter, an X region means a radio resource region in which X channels are transmitted from a standpoint of a BS or a node and means a radio resource region in which X channels are received from a standpoint of UE. For example, the E-PHICH region means a radio resource region in which E-PHICHs are transmitted.

An RS not used by an existing terminal can be used in the E-control region. An advanced terminal can receive a signal using an RS, not used by an existing terminal, in the E-control region.

The E-control region can be configured like an R-PDCCH region that is used for a BS to send control information to a relay station from a viewpoint of an allocated resource region. The R-PDCCH region can be configured by the slot as in the following table.

TABLE 6

| Configuration | 'DL-StartSymbol' | End symbol index |
| --- | --- | --- |
| 0 | 1 | 6 |
| 1 | 2 | 6 |
| 2 | 3 | 6 |

TABLE 7

| Configuration | Start symbol index | End symbol index |
| --- | --- | --- |
| 0 | 0 | 6 |
| 1 | 0 | 5 |

Table 6 shows an R-PDCCH configuration for a first slot, and Table 7 shows an R-PDCCH configuration for a second slot. A BS provides the parameter 'DL-StartSymbol' of Table 6 through a higher layer signal. If a BS and a relay station send downlink subframes that are time-aligned with a subframe boundary, the configuration 1 of Table 7 is used. If not, the configuration 0 of Table 7 is used. That is, an R-PDCCH ranges from an OFDM symbol of the first slot, indicated by the parameter 'DL-StartSymbol', to the OFDM symbol #6 or #5 of the second slot.

The E-control region can be configured in the same manner as this R-PDCCH region. For example, if a relay station is not present in a multi-node system the same resource region as the R-PDCCH region can be configured as an E-control region. A method of configuring the E-control region may be the same as or different from a method of configuring the R-PDCCH region.

The E-control region and the R-PDCCH region differ from each other in terms of their uses and transmitted control channels. That is, the R-PDCCH region is used for a BS to send control information to a relay station, and the E-control region is used for a BS or a node to send control information to UE. The control information transmitted in the E-control region is information that is eventually to be received by UE, and the control information can include cell-specific control information (e.g., system information), UE-specific control information, and node-specific control information. The node-specific control information includes configuration information about each antenna port, a virtual cell, or part of a cell when a plurality of physical nodes controlled by one BS configures the antenna port, the virtual cell, or part of the cell by forming one node or a node group including a plurality of nodes in a multi-node system. Alternatively, the node-specific control information includes information about a node-specific CSI-RS antenna port, CSI-RS configuration information, etc. Alternatively, the node-specific control information includes control information applied to UE group that belongs to each antenna port, a virtual cell, or part of a cell.

From a viewpoint of a control channel, only an R-PDCCH can be transmitted in the R-PDCCH region. In contrast, an E-PDCCH, an E-PCFICH, and an E-PHICH can be transmitted in the E-control region.

Figure 10:
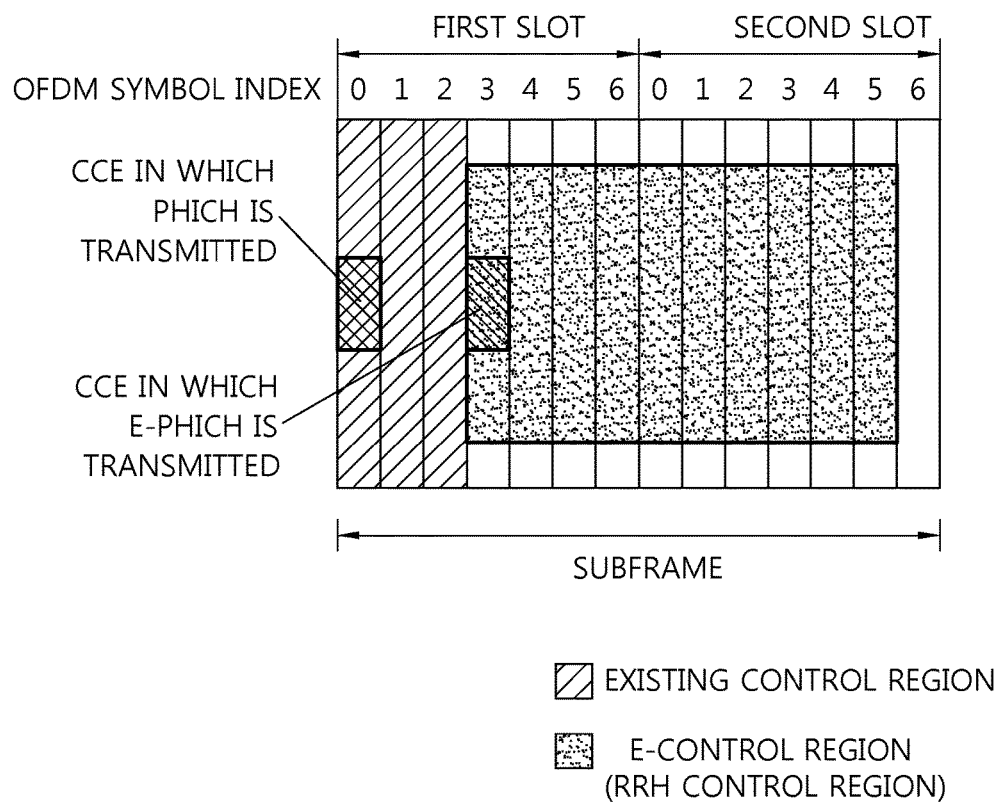
FIG. 10 shows a first example in which an E-PHICH is allocated.

FIG. 10 shows a first example in which an E-PHICH is allocated.

Referring to FIG. 10, an E-PHICH region can be included in an E-control region. For example, if an R-PDCCH region is used as an E-control region, an E-PHICH can be regulated so that it is transmitted in a specific location of the E-control region. In this case, E-PDCCHs can be transmitted in regions other than a region in which the E-PHICH is transmitted, of the E-control region. That is, it can be considered that the E-PHICH region is included in the E-PDCCH region.

An existing PDCCH and PHICH are transmitted by the Control Channel Element (CCE) in the first OFDM symbol of a subframe. Like in this method, an E-PHICH can be transmitted in a specific CCE of the E-control region, and an E-PDCCH can be transmitted in the remaining regions.

If an E-PHICH is subject to resource mapping by the CCE and transmitted like a PHICH, the number of PHICH groups newly added due to the E-PHICH needs to be added to the number of existing PHICH groups when calculating the total number of PHICH groups.

For example, Equation 2 can be modified as in the following equation.

$$N_{PHICH}^{group} = [N_g(N_{RB}^{DL}/8)] + N_{newPHICH}^{group} \quad \text{[Equation 15]}$$

In Equation 15, $N_{newPHICH}^{group}$ indicates the number of PHICH groups added due to an E-PHICH region.

Alternatively, a method of allocating new PHICH resources may be allocated to an E-PHICH. In this case, the definition of $N_{PHICH}^{group}$ is the same as the existing definition, but $N^{group}_{newPHICH}$ can be defined and a method of allocating newly defined E-PHICH resources can be used.

Figure 11:
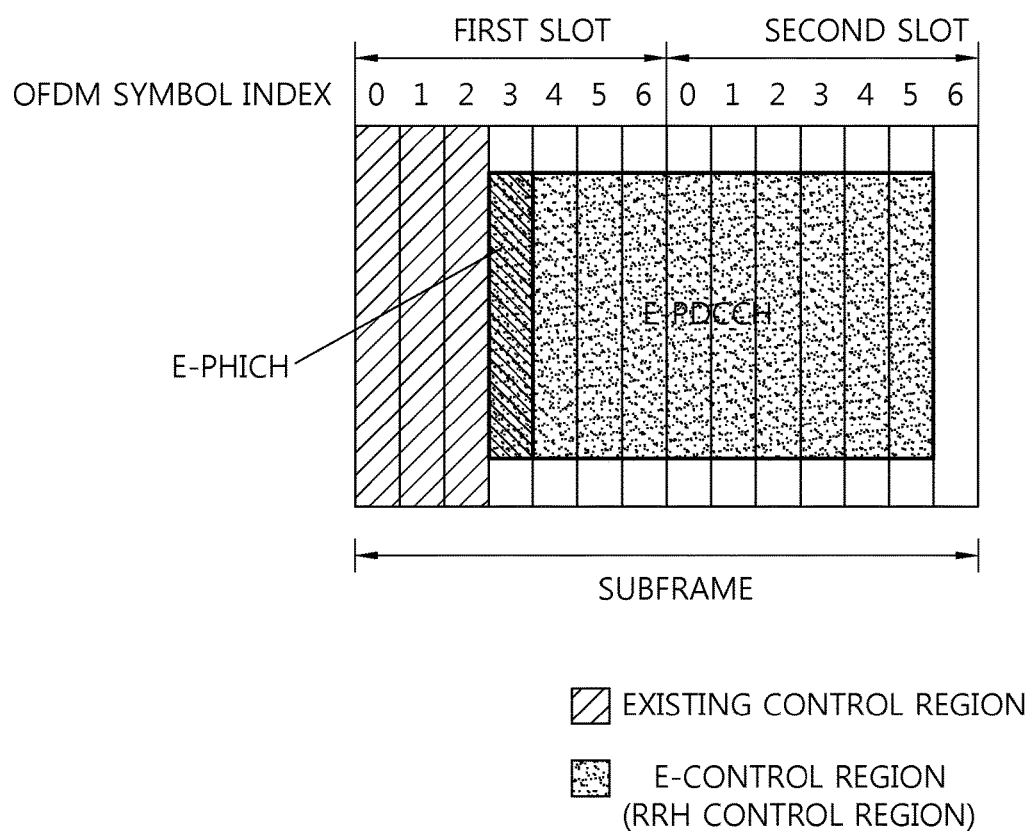
FIG. 11 shows a second example in which an E-PHICH is allocated.

FIG. 11 shows a second example in which an E-PHICH is allocated.

Referring to FIG. 11, an E-PHICH region is transmitted in an E-control region, but is not multiplexed with an E-PDCCH region by the CCE. Instead, the E-PHICH region is separated from the E-PDCCH region in a time domain and transmitted. That is, the E-PHICH region and the E-PDCCH region are subject to Time Division Multiplexing (TDM).

Figure 12:
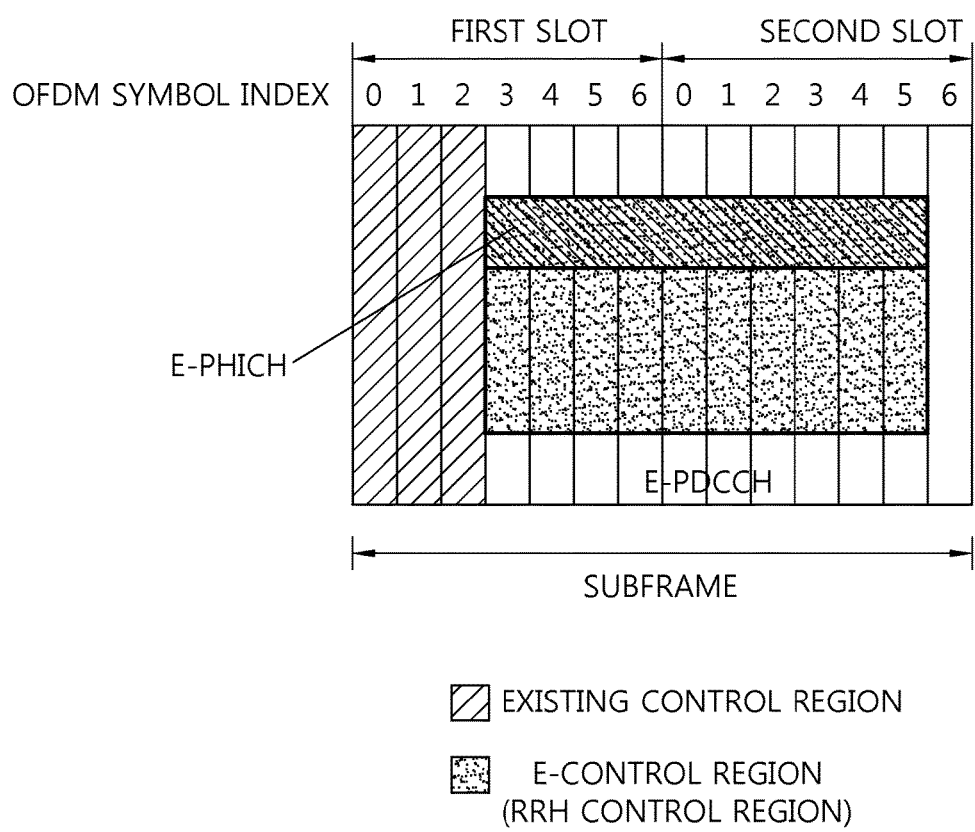
FIG. 12 shows a third example in which an E-PHICH is allocated.

FIG. 12 shows a third example in which an E-PHICH is allocated.

Referring to FIG. 12, like in FIG. 11, an E-PHICH region is transmitted in an E-control region, but is not multiplexed with an E-PDCCH region by the CCE. Instead, the E-PHICH region is separated from the E-PDCCH region in a frequency domain. That is, the E-PHICH region and the E-PDCCH region are subject to Frequency Division Multiplexing (FDM).

Furthermore, the E-PHICH region may be subject to TDM and FDM with the E-PDCCH region in the E-control region. That is, the E-PHICH can include some of OFDM symbols that form the E-control region in the time domain, and the E-PHICH can be transmitted in a resource region formed of some of resource blocks (or some subcarriers) that form the E-control region in the frequency domain.

FIGS. 10 to 12 illustrate that the E-PHICH region is included in the E-control region and configured to be contiguous to the E-PDCCH region, but is not limited thereto. That is, the E-PHICH region may be configured to be separated from the E-PDCCH region.

Figure 13:
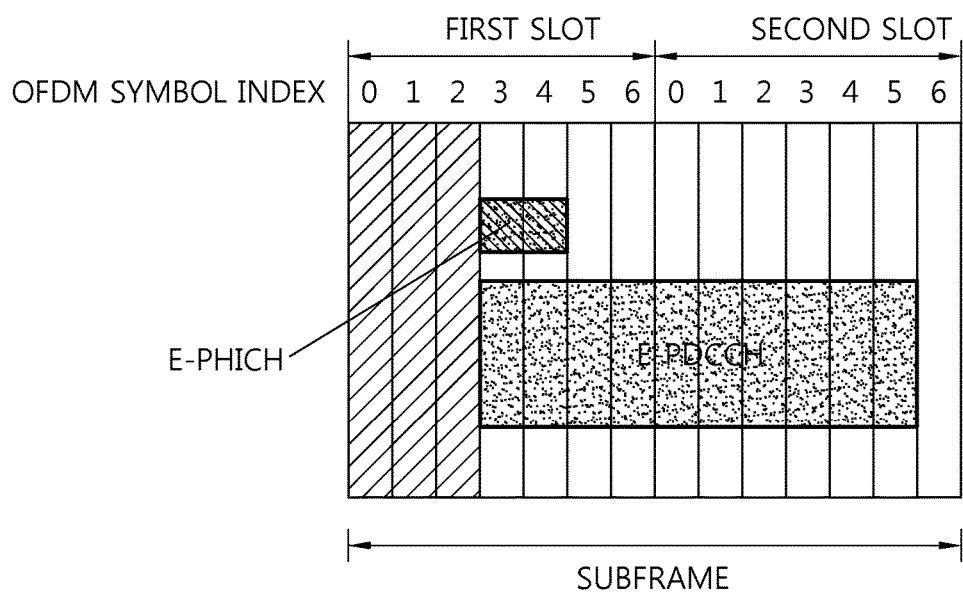
FIG. 13 shows a fourth example in which an E-PHICH is allocated.

FIG. 13 shows a fourth example in which an E-PHICH is allocated.

Referring to FIG. 13, an E-PHICH region is configured to be separated from an E-PDCCH region in a frequency domain. Of course, the E-PHICH region may be configured to be separated from the E-PDCCH region in a time domain. That is, the E-PHICH region can be present in a PDSCH region. In this case, the E-control region includes two non-contiguous resource regions.

Figure 14:
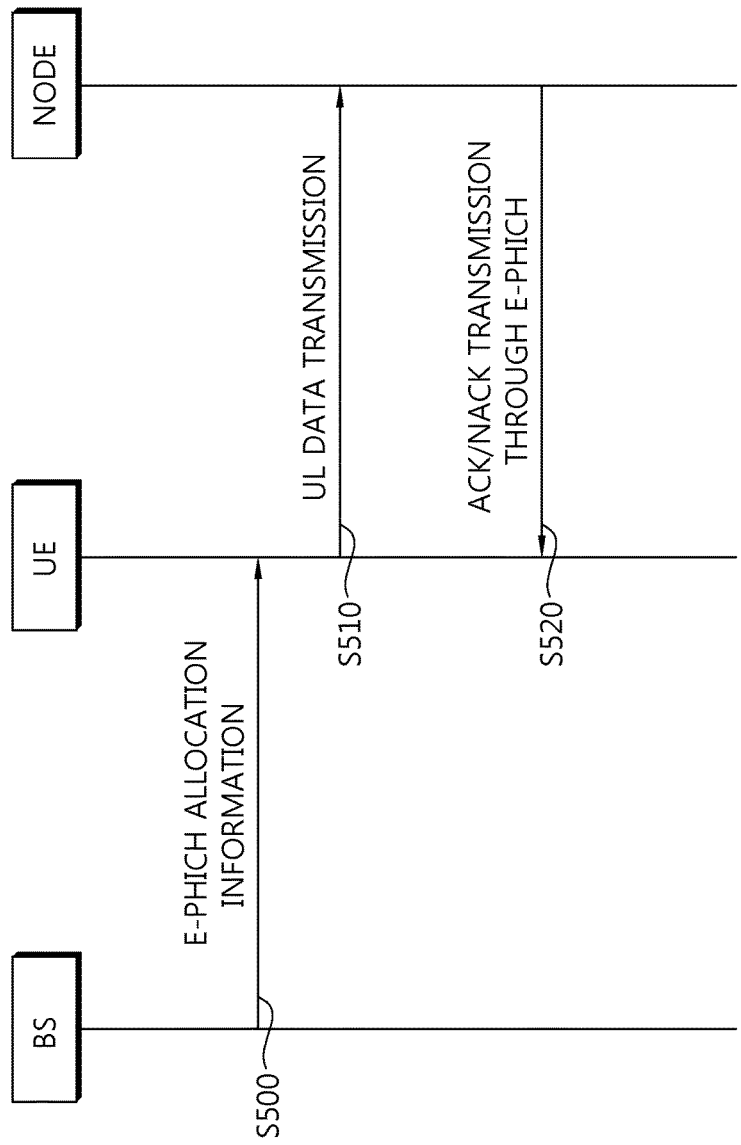
FIG. 14 shows an example of a method of performing an HARQ in a multi-node system.

FIG. 14 shows an example of a method of performing an HARQ in a multi-node system.

Referring to FIG. 14, a BS sends information about the allocation of an E-PHICH to UE (S500). The information about the allocation of the E-PHICH is information that informs the UE of an E-PHICH region.

The information about the allocation of the E-PHICH can be differently transmitted depending on a method of allocating the E-PHICH region. For example, if the E-PHICH region illustrated in FIGS. 10 to 12 is allocated according to a predetermined rule in an E-PDCCH region, the information about the allocation of the E-PHICH can include information about the location of the E-PDCCH region.

Alternatively, if the E-PHICH region is allocated independently from the E-PDCCH region, the information about the allocation of the E-PHICH can explicitly include information about the location of the E-PHICH region.

The information about the allocation of the E-PHICH can be transmitted through a higher layer signal, such as a Radio Resource Control (RRC) message.

If the E-PHICH region is allocated to a predetermined location, for example, an always fixed radio resource region depending on a system bandwidth, the information about the allocation of the E-PHICH may not be transmitted.

The terminal sends uplink data to a node within the multi-node system (S510). The uplink data can be transmitted through a PUSCH.

The node which has received the uplink data sends ACK/NACK through an E-PHICH region indicated by the information about the allocation of the E-PHICH (S520).

The node can know the E-PHICH region because it is connected to the BS in a wired way and controlled by the BS.

Figure 15:
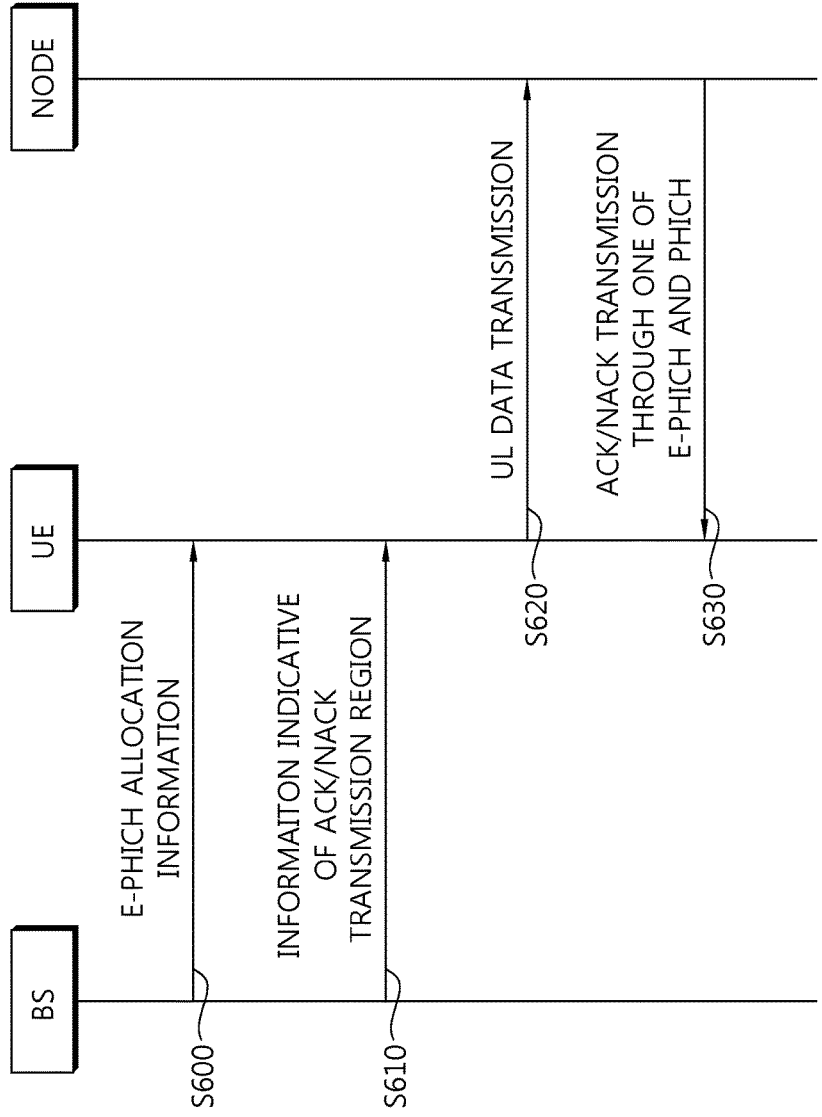
FIG. 15 shows another example of a method of performing an HARQ in a multi-node system.

FIG. 15 shows another example of a method of performing an HARQ in a multi-node system.

Referring to FIG. 15, a BS sends information about the allocation of an E-PHICH to UE (S600). The information about the allocation of the E-PHICH can be broadcasted or unicasted.

The BS sends information indicative of an ACK/NACK transmission region to the UE (S610). The information indicative of the ACK/NACK transmission region is information indicating that ACK/NACK for the transmission of uplink data by the UE is transmitted through which one of an existing PHICH region and an E-PHICH region. The information indicative of the ACK/NACK transmission region can be transmitted through a physical layer signal or a higher layer signal. The information indicative of the ACK/NACK transmission region may be included in the information about the allocation of the E-PHICH and transmitted or may be transmitted separately from the information about the allocation of the E-PHICH.

The terminal sends uplink data to a node within the multi-node system (S620).

The node which has received the uplink data sends ACK/NACK using one of the E-PHICH and a PHICH based on the information indicative of the ACK/NACK transmission region (S630).

Figure 16:
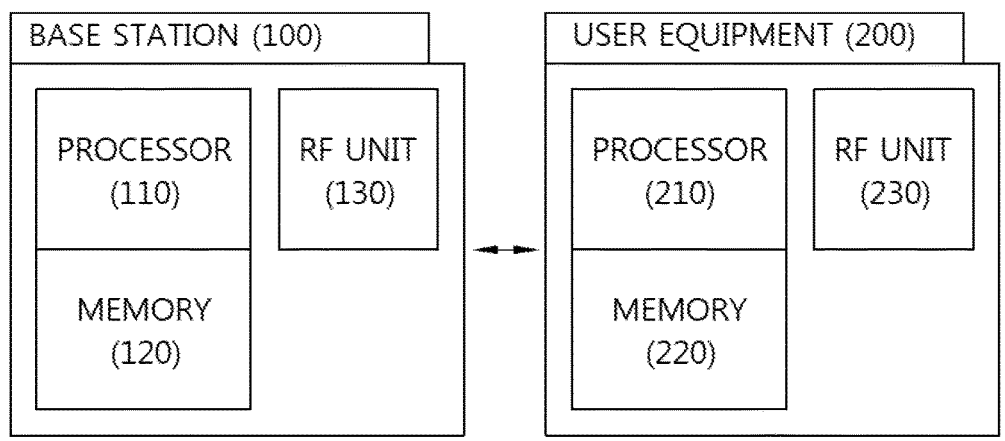
FIG. 16 is a block diagram showing a BS and UE.

FIG. 16 is a block diagram showing a BS and UE.

The BS 100 includes a processor 110, memory 120, and a Radio Frequency (RF) unit 130. The processor 110 implements the proposed functions, processes and/or methods. For example, the processor 110 sends information about the allocation of an E-PHICH and/or information indicative of an ACK/NACK transmission region to a terminal. Furthermore, the processor 110 controls a node within a multi-node system so that the node sends an ACK/NACK signal based on the information about the allocation of the E-PHICH and/or the information indicative of the ACK/NACK transmission region. The memory 120 is connected to the processor 110, and the memory stores various types of information for driving the processor 110. The RF unit 130 is connected to the processor 110, and the RF unit sends and/or receives radio signals.

The terminal 200 includes a processor 210, memory 220, and an RF unit 230. The processor 210 implements the proposed functions, processes and/or methods. For example, the processor 210 receives information about the allocation of an E-PHICH and/or information indicative of an ACK/NACK transmission region from a BS and sends uplink data to a node. Furthermore, the processor 210 receives an ACK/NACK signal for uplink data through a control channel that is indicated by the information about the allocation of the E-PHICH and/or the information indicative of the ACK/NACK transmission region. The memory 220 is connected to the processor 210, and the memory stores various types of information for driving the processor 210. The RF unit 230 is connected to the processor 210, and the RF unit sends and/or receives radio signals.

The processor 110, 210 may include Application-Specific Integrated Circuits (ASICs), other chipsets, logic circuits, data processors and/or converters for converting baseband signals and radio signals. The OFDM transmitter and the OFDM receiver of FIG. 7 can be implemented in the processor 110, 210. The memory 120, 220 may include Read-Only Memory (ROM), Random Access Memory (RAM), flash memory, memory cards, storage media and/or other storage devices. The RF unit 130, 230 may include one or more antennas for sending and/or receiving radio signals. When the embodiment is implemented in software, the above-described scheme may be implemented as a module (process, function, etc.) for performing the above function. The module may be stored in the memory 120, 220 and executed by the processor 110, 210. The memory 120, 220 may be placed inside or outside the processor 110, 210 and connected to the processor 110, 210 using a variety of well-known means Although the embodiments of the present invention have been described above, a person having ordinary skill in the art will appreciate that the present invention can be modified, changed, and implemented in various ways without departing from the technical spirit and scope of the present invention. Accordingly, the present invention is not limited to the embodiments, and the present invention can be said to include all embodiments within the scope of the claims below.

What is claimed is:

1. A method of a user equipment (UE) performing a Hybrid Automatic Repeat reQuest (HARQ) in a multi-node system comprising a plurality of nodes and a base station connected to the plurality of nodes and capable of controlling the plurality of nodes, the method comprising:
   receiving, from the base station, acknowledgement/not-acknowledgement (ACK/NACK) transmission region indicating information,
   wherein the ACK/NACK transmission region indicating information indicates whether an ACK/NACK signal is to be transmitted via a physical HARQ indicator channel (PHICH) or an enhanced PHICH (E-PHICH);
   transmitting, to at least one of the plurality of nodes, uplink data; and
   receiving, from the at least one node, the ACK/NACK signal for the uplink data via a singular downlink (DL) subframe based on the ACK/NACK transmission region indicating information,
   wherein the singular DL subframe includes a Physical Downlink Control Channel (PDCCH), an enhanced PDCCH (E-PDCCH) and the E-PHICH, the PHICH is located on the PDCCH, the E-PDCCH and the E-PHICH are located on a Physical Downlink Shared Channel (PDSCH), and the E-PHICH is separated from the E-PDCCH in a time domain and a frequency domain,
   wherein the E-PDCCH and the E-PHICH are associated with at least one region in which different control information is transmitted by each of the plurality of nodes, and
   wherein if the ACK/NACK transmission region indicating information indicates the PHICH, the ACK/NACK signal is transmitted via the PHICH, and if the ACK/NACK transmission region indicating information indicates the E-PHICH, the ACK/NACK signal is transmitted via the E-PHICH.

2. The method of claim 1, wherein the PHICH is placed in a first Orthogonal Frequency Division Multiplexing (OFDM) symbol of the singular DL subframe.

3. The method of claim 1, the method further comprising:
   receiving, from the base station, control channel allocation information,
   wherein the control channel allocation information is received through a higher layer signal.

4. The method of claim 3, wherein the control channel allocation information is received through a Radio Resource Control (RRC) message.

5. The method of claim 1,
   wherein the E-PDCCH comprises Orthogonal Frequency Division Multiplexing (OFDM) symbols from a specific OFDM symbol of a first slot to a last OFDM symbol or a second-last OFDM symbol of a second slot indicated by a higher layer signal in relation to one to the singular DL subframe.

6. The method of claim 1, wherein the E-PHICH is received in a specific Control Channel Element (CCE) within the singular DL subframe.

7. The method of claim 1, wherein radio resources through which the E-PHICH is received are determined based on a number of PHICH groups capable of being used in radio resources that are a sum of radio resources to which the PHICH is mapped to and radio resources to which the E-PHICH is mapped.

8. A user equipment (UE), comprising:
   a radio frequency unit configured to transmit and receive radio signals; and
   a processor connected to the radio frequency unit,
   wherein the processor is configured to:
      receive, from a base station, acknowledgement/not-acknowledgement (ACK/NACK) transmission region indicating information,
      wherein the ACK/NACK transmission region indicating information indicates whether an ACK/NACK signal is to be transmitted via a physical HARQ indicator channel (PHICH) or a enhanced PHICH (E-PHICH),
      transmit, to at least one of a plurality of nodes controlled by the base station, uplink data, and
      receive, from the at least one node, the ACK/NACK signal for the uplink data via a singular downlink (DL) subframe based on the ACK/NACK transmission region indicating information,
      wherein the singular DL subframe includes a Physical Downlink Control Channel (PDCCH), an enhanced PDCCH (E-PDCCH) and the E-PHICH, the PHICH is located on the PDCCH, the E-PDCCH and the E-PHICH are located on a Physical Downlink Shared Channel (PDCCH), and the E-PHICH is separated from the E-PDCCH in a time domain and a frequency domain,
      wherein the E-PDCCH and the E-PHICH are associated with at least one region in which different control information is transmitted by each of the plurality of nodes, and
      wherein if the ACK/NACK transmission region indicating information indicates the PHICH, the ACK/NACK signal is transmitted via the PHICH, and if the ACK/NACK transmission region indicating information indicates the E-PHICH, the ACK/NACK signal is transmitted via the E-PHICH.

* * * * *